(12) United States Patent
Ishiguro et al.

(10) Patent No.: US 10,110,775 B2
(45) Date of Patent: Oct. 23, 2018

(54) IMAGE READING DEVICE, METHOD FOR THE SAME TO DETECT A FOREIGN BODY ON A SCANNER GLASS PLATEN, AND RECORDING MEDIUM

(71) Applicant: Konica Minolta, Inc., Tokyo (JP)

(72) Inventors: Kazuhiro Ishiguro, Toyohashi (JP); Yasuyuki Kamai, Toyohashi (JP)

(73) Assignee: Konica Minolta, Inc., Tokyo (JP)

( * ) Notice: Subject to any disclaimer, the term of this patent is extended or adjusted under 35 U.S.C. 154(b) by 36 days.

(21) Appl. No.: 15/470,295

(22) Filed: Mar. 27, 2017

(65) Prior Publication Data

US 2017/0289395 A1 Oct. 5, 2017

(30) Foreign Application Priority Data

Mar. 30, 2016 (JP) .................................. 2016-68831

(51) Int. Cl.
| | | |
|---|---|---|
| H04N 1/387 | (2006.01) | |
| H04N 1/00 | (2006.01) | |
| H04N 1/10 | (2006.01) | |
| H04N 1/12 | (2006.01) | |
| H04N 1/193 | (2006.01) | |
| H04N 1/401 | (2006.01) | |
| H04N 1/407 | (2006.01) | |

(52) U.S. Cl.
CPC ....... *H04N 1/3876* (2013.01); *H04N 1/00018* (2013.01); *H04N 1/00037* (2013.01); *H04N 1/00063* (2013.01); *H04N 1/10* (2013.01); *H04N 1/1235* (2013.01); *H04N 1/193* (2013.01); *H04N 1/401* (2013.01); *H04N 1/4074* (2013.01); *H04N 2201/0094* (2013.01)

(58) Field of Classification Search
CPC ............................ H04N 1/3876; H04N 1/401
See application file for complete search history.

(56) References Cited

FOREIGN PATENT DOCUMENTS

| JP | 2000-287039 | 10/2000 |
|---|---|---|
| JP | 2002-185767 | 6/2002 |
| JP | 2002-271631 | 9/2002 |

*Primary Examiner* — Christopher D Wait
(74) *Attorney, Agent, or Firm* — Baker & Hostetler LLP

(57) ABSTRACT

An image reading device includes: a scanner glass; photosensors arranged at intervals in a main scanning direction to read a document conveyed in a sub-scanning direction; an adjuster that adjusts the size of an overlapping area between a first and second image obtained by neighboring photosensors, the overlapping area constituting a first area of the first image and a second area of the second image; a superimposing portion that shifts either one of images of the first and second area to the other one; a judgment portion that judges whether the images having different focal depths exist based on the degree of matching between the first and second area; and a detector that detects a foreign body on the scanner glass platen by detecting a continuous image stretching in a document conveying direction in both of the images having different focal depths, if the images having different focal depths exist.

21 Claims, 13 Drawing Sheets

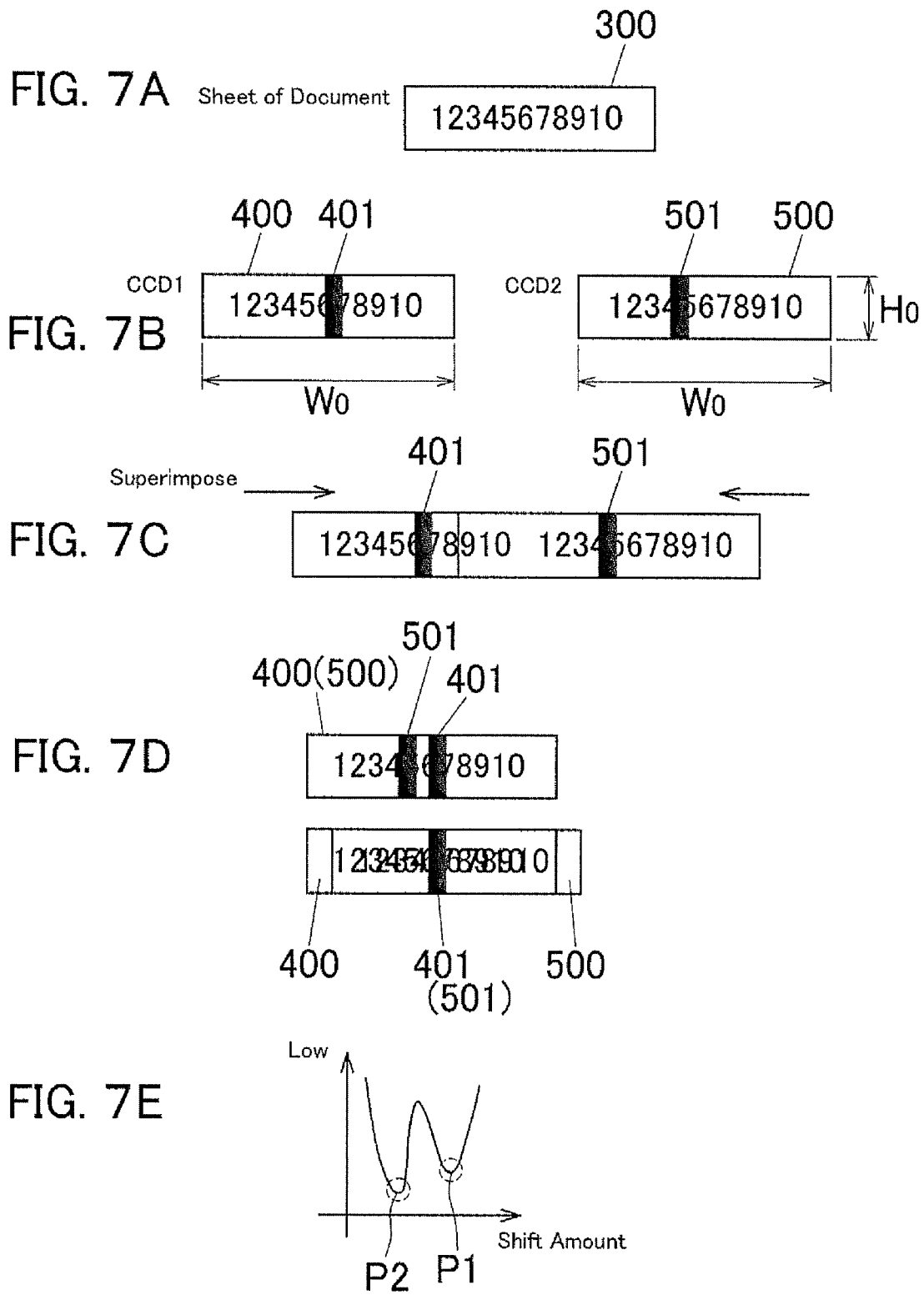

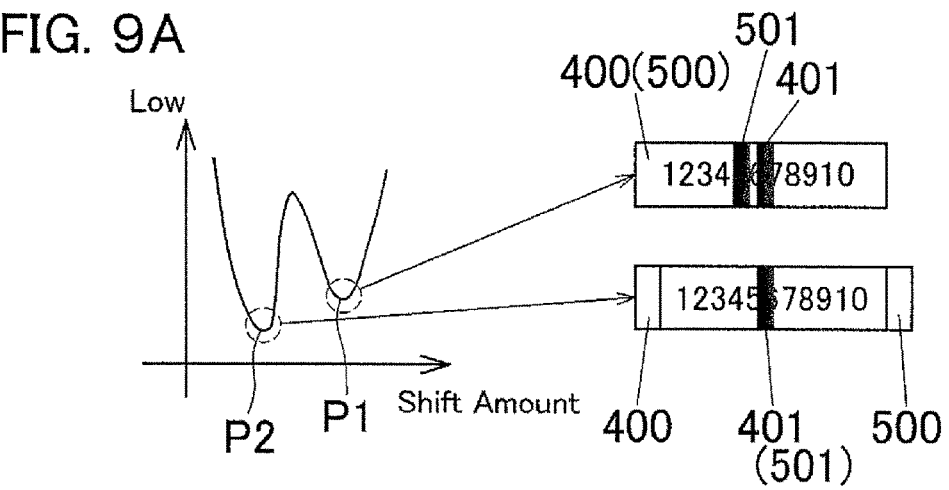
FIG. 9A
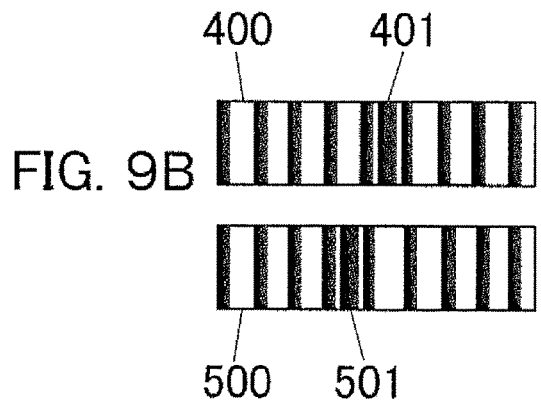
FIG. 9B
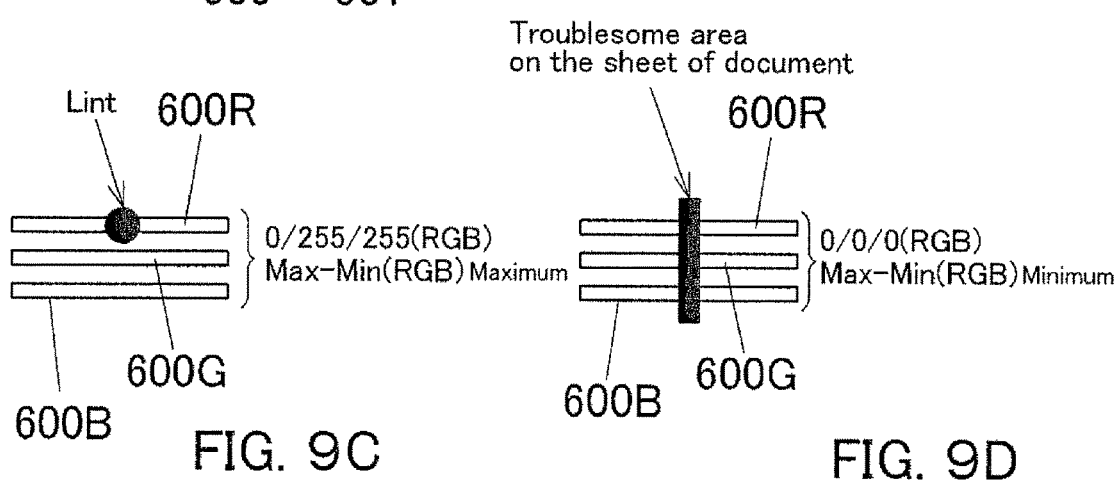
FIG. 9C
FIG. 9D

IMAGE READING DEVICE, METHOD FOR THE SAME TO DETECT A FOREIGN BODY ON A SCANNER GLASS PLATEN, AND RECORDING MEDIUM

This application claims priority under 35 U.S.C. § 119 to Japanese Patent Application No. 2016-068831 filed on Mar. 30, 2016, the entire disclosure of which is incorporated herein by reference.

BACKGROUND OF THE INVENTION

Field of the Invention

The present invention relates to an image reading device to be used in an image forming apparatus, for example, the image reading device being configured to read an image on a sheet of document conveyed on a scanner glass platen in a sub-scanning direction, a method for the image reading device to detect a foreign body on the scanner glass platen, and a recording medium.

Description of the Related Art

The following description sets forth the inventor's knowledge of related art and problems therein and should not be construed as an admission of knowledge in the prior art.

Image forming apparatuses are commonly provided with an image reading device with an on-board automatic document feeder. Since a sheet of document is conveyed in a sub-scanning direction on a scanner glass platen of such an image forming apparatus, a scanned image may contain a linear noise area, which stretches in a document conveying direction, due to a foreign body such as lint, dust, or dirt on the scanner glass platen.

To remove such a noise area, the following methods have been already proposed and known: a method of detecting a foreign body on a scanner glass platen and a method of detecting a noise area due to a foreign body from a scanned image.

For example, Japanese Unexamined Patent Application Publication No. 2000-287039 discloses a technique of identifying the position of a foreign body and replacing the affected pixels with white pixels.

For another example, Japanese Unexamined Patent Application Publication No. 2002-185767 discloses a technique of counting up all lines in a sub-scanning direction and detecting noise when the level is equal to or greater than its threshold value.

According to the publications, these techniques are provided with one photo-sensor, such as a CCD image sensor, disposed in a main scanning direction to read a document image. This configuration with one photo-sensor allows identifying the source of noise as either a sheet of document or a foreign body such as lint on the scanner glass platen, using one single scanned image. These techniques, therefore, do not cover detecting a foreign body with a high degree of accuracy; in other words, these are hardly capable of correctly identifying the source of a liner noise area stretching in a direction, in which a sheet of document is conveyed, as either a sheet of document or a foreign body on the scanner glass platen.

To achieve accurate detection, Japanese Unexamined Patent Application Publication No. 2002-271631 discloses a technique of scanning images by a 4-CCD image sensor with a gray (Gr), red (R), green (G), and blue (B) channels and comparing these images using the interval between the lines for these channels, which are arranged in a document conveying direction.

However, the technique disclosed in Japanese Unexamined Patent Application Publication No. 2002-271631 is based on the assumption that the size of a foreign body is equal to or smaller than the interval between the lines of the CCD image sensor; that is, it is hardly capable of detecting a foreign body whose size is larger than the interval between the lines. Furthermore, the technique is not capable of detecting a foreign body hiding all the Gr and RGB channels.

As described above, a foreign body such as lint, dust, or dirt on a scanner glass platen causes a linear noise area in a scanned image; the imaging performance of an image reading device with an on-board automatic document feeder is thus affected negatively. Such an image reading device does not cover detecting a foreign body with a high degree of accuracy; in other words, it is hardly capable of correctly identifying the source of noise as either a sheet of document or a foreign body on the scanner glass platen.

SUMMARY OF THE INVENTION

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

A first aspect of the present invention relates to an image reading device including:
  a scanner glass; and
  a plurality of CCD photo-sensors being arranged at intervals in a main scanning direction, the CCD photo-sensors being configured to read an image on a sheet of document conveyed in a sub-scanning direction on a document conveying surface, the document conveying surface being disposed above the scanner glass,
wherein the CCD photo-sensors are arranged in such a manner as to allow two or more neighboring ones of the CCD photo-sensors to obtain a first image and a second image by scanning the same area of the surface of the scanner glass and the document conveying surface, the image reading device further comprising:
  a size adjuster being configured to adjust the size, in a main scanning direction and a sub-scanning direction, of an overlapping area between the first and second image obtained by the neighboring CCD photo-sensors, the overlapping area constituting a first area of the first image and a second area of the second image;
  a superimposing portion being configured to superimpose either one of an image of the first area and an image of the second area on the other one by shifting at least one of the image of the first area and the image of the second area to the other one, the first and second area having the size adjusted by the size adjuster;
  a degree of matching calculator being configured to calculate the degree of matching between the image of the first area and the image of the second area while the superimposing portion is shifting at least one of the image of the first area and the image of the second area to the other one;
  a judgment portion being configured to judge whether or not the images having different focal depths exist based on the degree of matching calculated by the degree of matching calculator; and
  a foreign body detector being configured to detect a foreign body on the surface of the scanner glass by detecting a continuous image stretching in a document conveying direction in both of the images having different focal depths, if the judgment portion judges that the images having different focal depths exist.

A second aspect of the present invention relates to a method for an image reading device to detect a foreign body on the surface of a scanner glass, the image reading device including:

the scanner glass; and a plurality of CCD photo-sensors being arranged at intervals in a main scanning direction, the CCD photo-sensors being configured to read an image on a sheet of document conveyed in a sub-scanning direction on a document conveying surface, the document conveying surface being disposed above the scanner glass, wherein the CCD photo-sensors are arranged in such a manner as to allow two or more neighboring ones of the CCD photo-sensors to obtain a first image and a second image by scanning the same area of the surface of the scanner glass and the document conveying surface, the method comprising the following steps of the image reading device:

adjusting the size, in a main scanning direction and a sub-scanning direction, of an overlapping area between the first and second image obtained by the neighboring CCD photo-sensors, the overlapping area constituting a first area of the first image and a second area of the second image;

superimposing either one of an image of the first area and an image of the second area on the other one by shifting at least one of the image of the first area and the image of the second area to the other one, the first and second area having the size being adjusted;

calculating the degree of matching between the image of the first area and the image of the second area while at least one of the image of the first area and the image of the second area is being shifted to the other one;

judging whether or not the images having different focal depths exist with reference to the degree of matching being calculated; and detecting a foreign body on the surface of the scanner glass by detecting a continuous image stretching in a document conveying direction in both of the images having different focal depths, if it is judged that the images having different focal depths exist.

A third aspect of the present invention relates to a non-transitory computer-readable recording medium storing a program to be run by an image reading device being configured to detect a foreign body on the surface of a scanner glass, the image reading device including:

the scanner glass; and a plurality of CCD photo-sensors being arranged at intervals in a main scanning direction, the CCD photo-sensors being configured to read an image on a sheet of document conveyed in a sub-scanning direction on a document conveying surface, the document conveying surface being disposed above the scanner glass, wherein the CCD photo-sensors are arranged in such a manner as to allow two or more neighboring ones of the CCD photo-sensors to obtain a first image and a second image by scanning the same area of the surface of the scanner glass and the document conveying surface, the program making a computer of the image reading device execute:

adjusting the size, in a main scanning direction and a sub-scanning direction, of an overlapping area between the first and second image obtained by the neighboring CCD photo-sensors, the overlapping area constituting a first area of the first image and a second area of the second image;

superimposing either one of an image of the first area and an image of the second area on the other one by shifting at least one of the image of the first area and the image of the second area to the other one, the first and second area having the size being adjusted;

calculating the degree of matching between the image of the first area and the image of the second area while at least one of the image of the first area and the image of the second area is being shifted to the other one;

judging whether or not the images having different focal depths exist with reference to the degree of matching being calculated; and detecting a foreign body on the surface of the scanner glass by detecting a continuous image stretching in a document conveying direction in both of the images having different focal depths, if it is judged that the images having different focal depths exist.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which:

FIGS. 7A to 7E are explanatory views on Steps S24 to S26 in the FIG. 5 flowchart when there is a foreign body such as lint or dust on the scanner glass platen;

FIGS. 9A to 9D are explanatory views on steps in the FIG. 8 flowchart;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying drawings.

Figure 1:
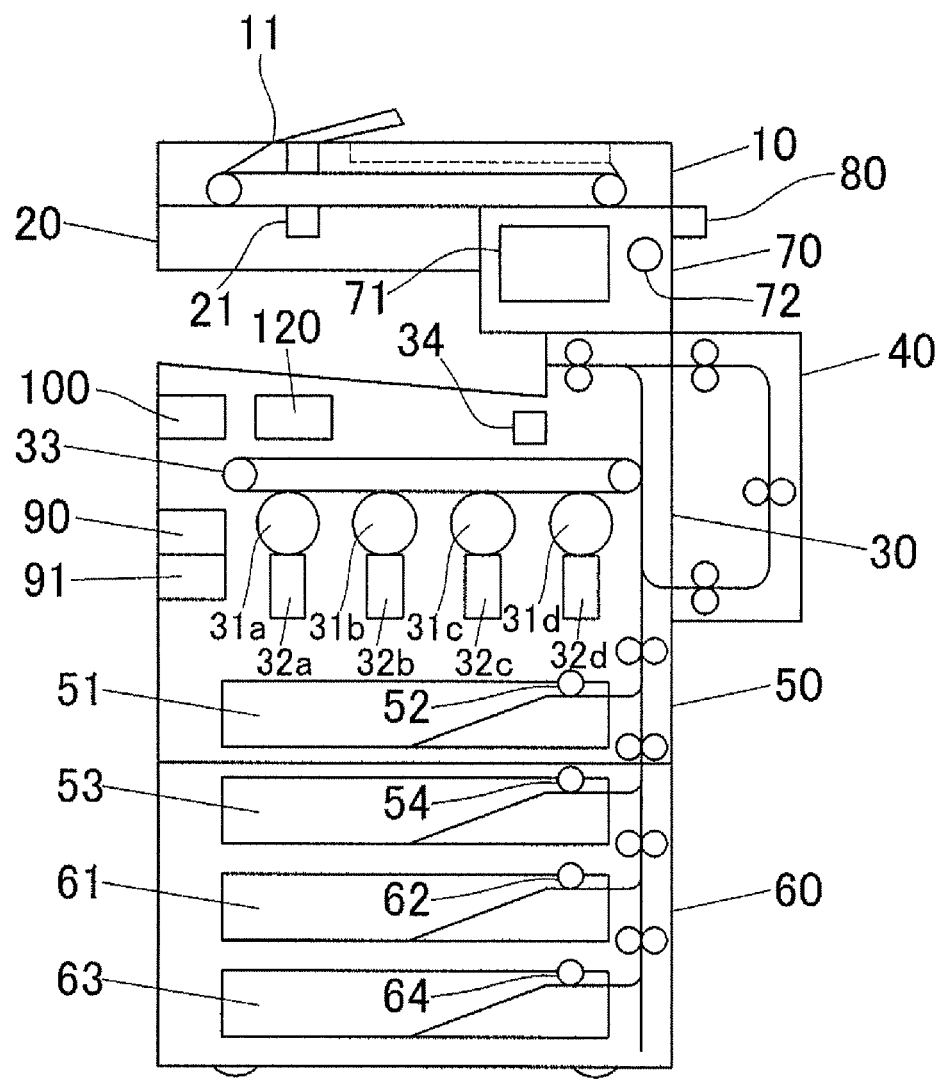
FIG. 1 illustrates a comprehensive configuration of an image forming apparatus provided with an image reading device according to one embodiment of the present invention.

FIG. 1 illustrates a comprehensive configuration of an image forming apparatus provided with an image reading device according to one embodiment of the present invention. As illustrated in this figure, the image forming apparatus is provided with an automatic document feeder 10, a document scanner 20 corresponding to an image reading device, an imaging portion 30, an automatic duplexer 40, a sheet feeder 50, a paper cabinet 60, an operation panel 70, a facsimile unit 90, a communication interface (I/F) unit 91, a controller 100, and a memory 120.

The automatic document feeder 10 automatically conveys multiple sheets of document put on a sheet feeder tray, one after another, to a document scanning position predetermined on a platen that is the surface of a scanner glass of the document scanner 20. The automatic document feeder 10 is a publicly known device that is configured to push out a sheet of document onto a document sheet output tray every time the document scanner 20 finishes reading it. The automatic document feeder 10 is provided with a document placement sensor 11, which is comprised of a publicly known tactile switch. The document placement sensor 11 judges whether or not a document is properly placed and transmit the result of judgment to the controller 100 by signal.

The document scanner 20 scans an image on a sheet of document at the document scanning position in a suitable manner for the size of the sheet of document. Subsequently, the document scanner 20 receives light emitted by a luminous source toward the sheet of document then reflected therefrom, as incident light, converts the incident light to electrical signals, then transfers them to the controller 100 as image data. The document scanner 20 is provided with a device lift sensor 21, which is comprised of a publicly known magnetic sensor. The device lift sensor 21 judges whether or not the automatic document feeder 10 is lifted and transmits the result of judgment to the controller 100 by signal.

The operation panel 70 is a publicly-known user interface, which is provided with a touchscreen entry portion 71 and a key entry portion 72. The operation panel 70 is further provided with a secondary power switch 80. The secondary power switch 80 is a switch that allows the user to manually switch the operation mode to sleep mode that is power-saving mode.

The controller 100 performs various data processing tasks such as shading correction on the scanned image received. In synchronization with a sheet of paper being supplied, the controller 100 outputs signal to drive a laser diode along every main scanning line. Furthermore, in this embodiment, the controller 100 detects a foreign body on a scanner glass platen 201 using images obtained by CCD image sensors and performs image correction. This will be later described in details.

The facsimile unit 90 is connected to a public telephone network; it is an interface for transmission and reception of image data.

The communication I/F unit 91 is an interface for connecting to external networks to which personal computers and other apparatuses belong. The external networks include LAN and USB.

The memory 120 stores image data received from the controller 100 and other data. The memory 120 is comprised of a hard disk drive (HDD), for example.

The imaging portion 30 forms an image by an electro-photographic method that is widely known. The imaging portion 30 is provided with photo-conductor drums 31a, 31b, 31c, and 31d, photo-conductor exposure units 32a, 32b, 32c, and 32d, a transfer belt 33, a front cover sensor 34, and, although it is not shown in this figure, a front cover for protecting all the preceding portions. The imaging portion 30 forms a four-color image for yellow, magenta, cyan, and black printing. In accordance with signals received from the controller 100, the photo-conductor exposure units 32 generate laser light and expose the surfaces of the photo-conductor drums 31 with the laser light. The front cover sensor 34 is comprised of a publicly known tactile switch. The front cover sensor 34 judges whether or not the front cover is open and transmits the result of judgment to the controller 100 by signal. The transfer belt 33 receives CMYK toner images from the surfaces of the photo-conductor drums 31 one after another and transfers them onto a sheet of paper that is delivered from the sheet feeder 50.

The sheet feeder 50 is provided with paper cassettes 51 and 53 for loading sheets of paper and paper pickup rollers 52 and 54 for picking up the sheets of paper therefrom one after another. The sheet feeder 50 feeds the sheets of paper into the imaging portion 30.

Similarly, the paper cabinet 60 is provided with paper cassettes 61 and 63 for loading sheets of paper and paper pickup rollers 62 and 64 for picking up the sheets of paper therefrom one after another. The paper cabinet 60 feeds the sheets of paper into the imaging portion 30 through the sheet feeder 50.

The automatic duplexer 40 switches the direction of conveyance to its opposite to turn a sheet of paper with printing on one side upside down. The automatic duplexer 40 enables duplex printing by feeding a sheet of paper twice.

Figure 2:
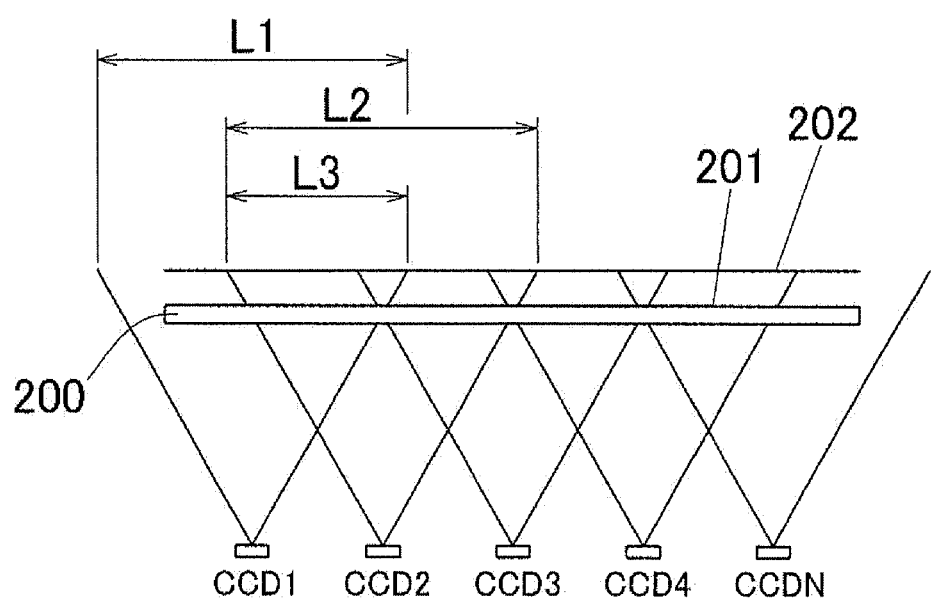
FIG. 2 schematically illustrates a configuration of a document scanner 20 in such a manner as to be seen from a sub-scanning direction (a direction in which a sheet of document is conveyed)

FIG. 2 schematically illustrates a configuration of the document scanner 20 illustrated in FIG. 1 in such a manner as to be seen from a sub-scanning direction (a direction in which a sheet of document is conveyed).

In this figure, the code 200 indicates a scanner glass (as known as platen). It is necessary for the automatic document feeder 10 to convey a sheet of document while keeping it very close to the scanner glass platen 201 that is the top surface of the scanner glass 200. Therefore, the automatic document feeder 10 is further provided with a document conveying surface 202 above the scanner glass platen 201, allowing a sheet of document to pass through a small clearance between the scanner glass platen 201 and the document conveying surface 202. The small clearance between the scanner glass platen 201 and the document conveying surface 202 is kept by a sheet-like space keeper, for example, disposed at a position required.

Provided below the scanner glass 200 are a plurality of CCD image sensors 1 to N that are CCD photo-sensors for optically receiving images reduced by lenses not shown in this figure. The CCD image sensors 1 to N (also to be referred to as "CCDs" for simplicity) are arranged at intervals in such a manner as to obtain a batch of images by splitting a document image along every main scanning line (stretch in a horizontal direction in FIG. 2) and in such a manner as to allow two or more neighboring ones of the CCDs to obtain images by scanning the same area of the scanner glass platen 201 and the document conveying surface 202.

For example, the CCD 1 scans an area L1 that stretches in a main scanning direction and the CCD 2 scans an area L2 that stretches in a main scanning direction. An area L3 is an overlapping area between the areas L1 and L2, which corresponds to a right portion of the area L1 and a left portion of the area L2. That is, the CCDs 1 and 2 can obtain images by scanning the same area of the scanner glass platen 201 and the document conveying surface 202. The same also holds true for all neighboring ones of the CCDs 2 to N.

The CCDs 1 to N each are comprised of RGB channels or RGB and Gr channels, which are arranged in a sub-scanning direction that is a direction in which a sheet of document is conveyed (also to be referred to as "a direction of FD").

Figure 3:
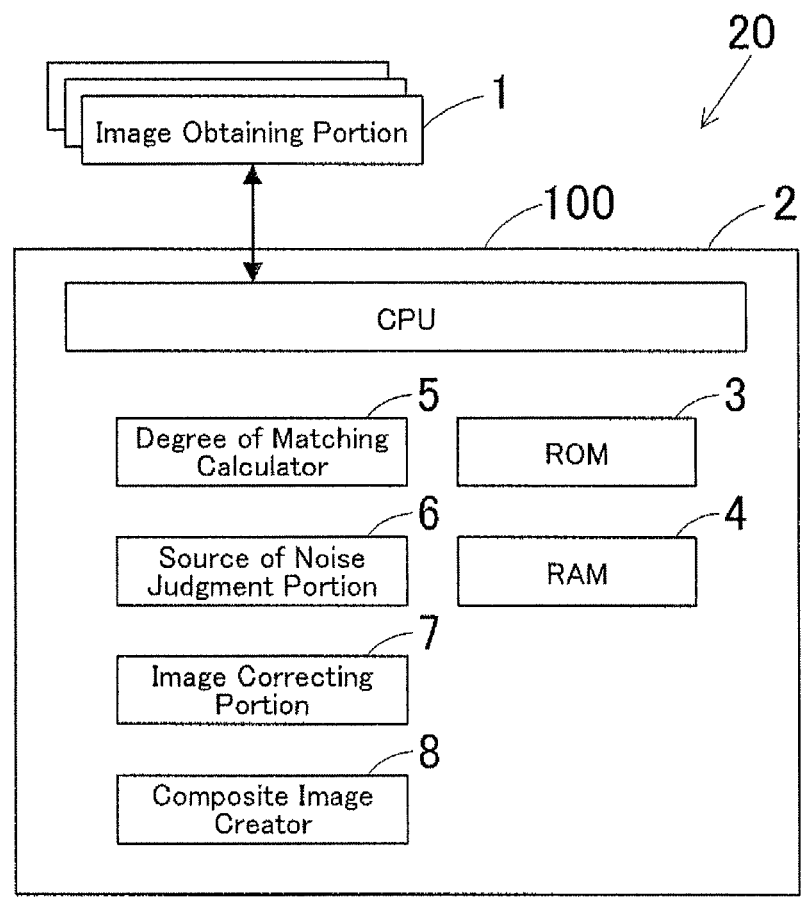
FIG. 3 is a block diagram illustrating an electrical configuration of the document scanner 20.

FIG. 3 is a block diagram illustrating an electrical configuration of the document scanner 20. The document scanner 20 is provided with: an image obtaining portion 1 consisting of the CCDs 1 to N; and the controller 100. The controller 100 detects a foreign body on the scanner glass platen 201 using images obtained by the image obtaining portion 1 and performs image correction.

The controller 100 is provided with a CPU 2, a ROM 3, and a RAM 4. The controller 100 is further provided with, as its functions, a degree of matching calculator 5, a source of noise identification portion 6, an image correcting portion 7, a composite image creator 8.

The CPU 2 controls the document scanner 20, including the image obtaining portions 1 and the controller 100, in a unified and systematic manner. ROM 3 is a memory for storing operation programs for the CPU 2 and other data; the RAM 4 is a memory for providing a work area for the CPU 2 to execute processing in accordance with the operation programs stored on the ROM 3.

The image obtaining portion 1 allows the CCDs 1 to N to obtain a batch of images by splitting a document image along every main scanning line. The image obtaining portion 1 inputs the obtained images to the controller 100 and records the same on the RAM 4.

The degree of matching calculator 5 extracts a first image and a second image obtained by neighboring CCDs from the images received from the image obtaining portion 1 and adjusts the size, in a main scanning direction and a sub-scanning direction, of an overlapping area between the first and second image. The overlapping area whose size is adjusted constitutes a first area of the first image and a second area of the second image. The degree of matching calculator 5 shifts either one of the image of the first area and the image of the second area to the other one until these images are exactly superimposed one on the other; during that time, the degree of matching calculator 5 further calculates the degree of matching between the image of the first area and the image of the second area.

With reference to the degree of matching obtained by the degree of matching calculator 5, the source of noise identification portion 6 judges the image of a sheet of document on the document conveying surface 202 or a noise image due to a foreign body on the scanner glass platen 201.

The image correcting portion 7 detects a clean image in either one of the first and second area, at a position corresponding to the position of the noise image in the other one and performs image correction by replacing the noise image with the clean image.

With reference to the degree of matching obtained by the degree of matching calculator 5, the composite image creator 8 creates a composite image based on the images of the first and second area. By repeating this operation, the composite image creator 8 can create one whole composite document image based on all the images obtained by the CCDs 1 to N.

Figure 4:
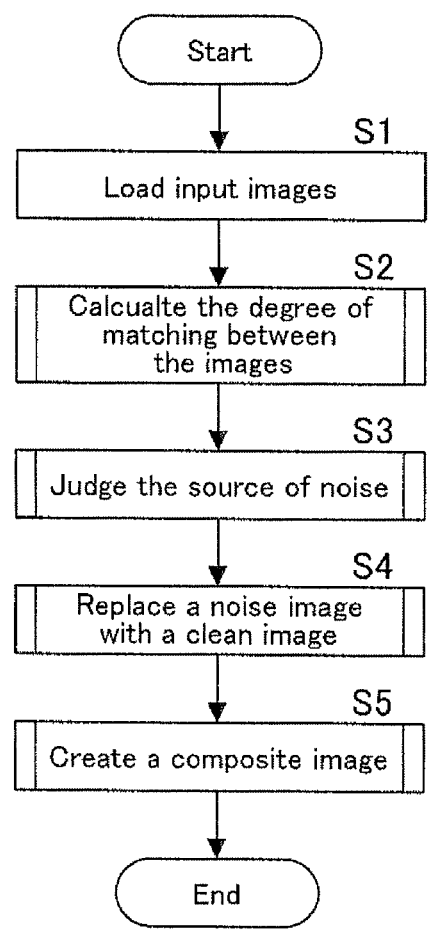
FIG. 4 is a main flowchart representing the entire operation to be performed by the document scanner 20.

FIG. 4 is a main flowchart representing the entire operation to be performed by the document scanner 20. The operation represented by the flowchart is performed by the CPU 2 of the document scanner 20 running an operation program stored on a recording medium such as the ROM 3.

Upon input of images from the image obtaining portion 1 comprised of the CCDs 1 to N, the CPU 2 loads the images onto the RAM 4 (Step S1). The CPU 2 extracts a first image and a second image obtained by neighboring CCDs (for example, the CCDs 1 and 2) therefrom and adjusts the size, in a main scanning direction and a sub-scanning direction, of an overlapping area between the first and second image. The overlapping area whose size is adjusted constitutes a first area of the first image and a second area of the second image. The CPU 2 shifts at least either one of the image of the first area and the image of the second area to the other one until these images are exactly superimposed one on the other; during that time, the CPU 2 further calculates the degree of matching between the image of the first area and the image of the second area (Step S2).

The CPU 2 can calculate the degree of matching using the following methods: calculating the logical sum or exclusive logical sum of binary pixel values; calculating the sum of squared differences in pixel value; and other methods. These methods will be later described in details.

With reference to the result of calculation, the CPU 2 identifies the source of noise as either a sheet of document on the document conveying surface 202 or a foreign body on the scanner glass platen 201. In other words, the CPU 2 judges whether or not there is a foreign body on the scanner glass platen 201 (Step S3). Depending on the result of judgment, the CPU 2 detects a clean image in either one of the first and second area, at a position corresponding to the position of the noise image in the other one. The CPU 2 then replaces the noise image with the clean image (Step S4).

The CPU 2 creates a composite image based on the first and second area exactly superimposed one on the other (Step S5).

The above-described flowchart runs every time images are input by the CCDs 1 to N; one whole composite document image will be created accordingly.

Figure 5:
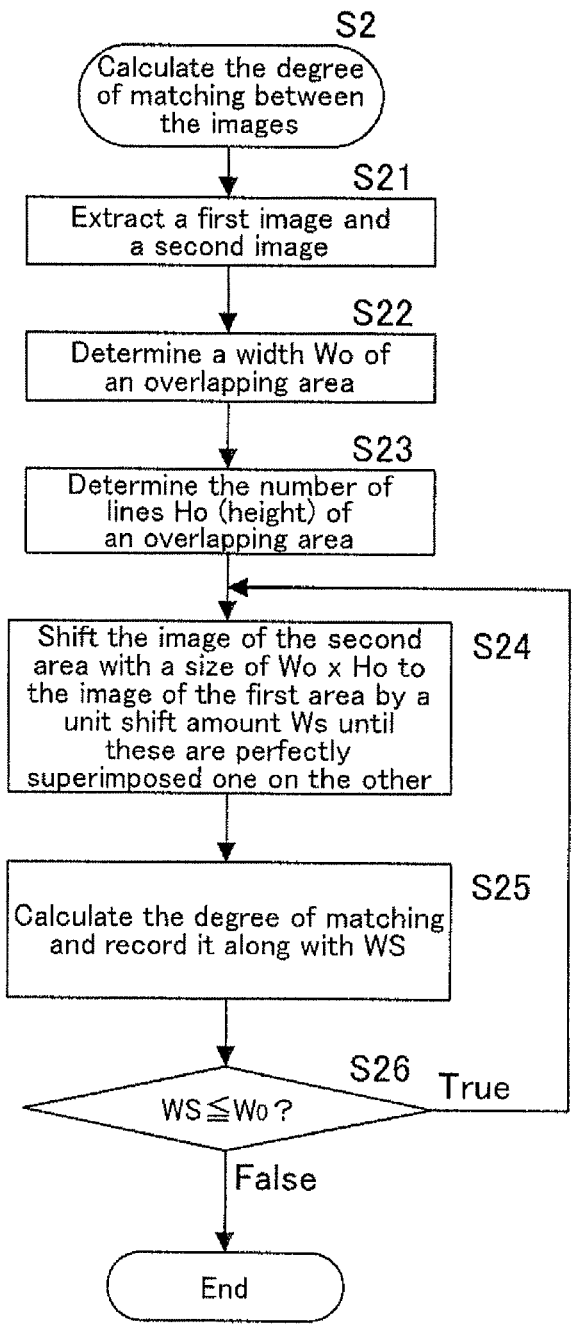
FIG. 5 is a flowchart representing the operation of calculating the degree of matching between images, which is Step S2 in the FIG. 4 flowchart.
Figures 6A, 6B:
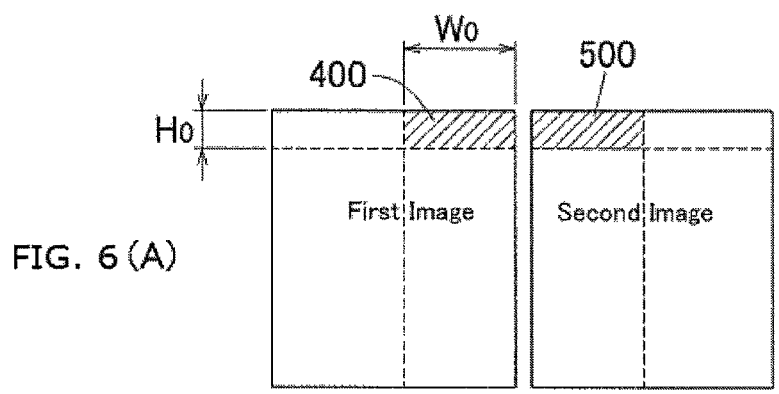
FIGS. 6A and 6B are explanatory views on steps in the FIG. 5 flowchart.

FIG. 5 is a flowchart representing the operation of calculating the degree of matching between images, which is Step S2 in the FIG. 4 flowchart; FIGS. 6A and 6B are explanatory views on steps in the FIG. 5 flowchart.

The CPU 2 extracts a first image and a second image obtained by neighboring CCDs from the images input by the multiple CCDs 1 to N (Step S21). The CPU 2 then adjusts the width Wo that is the size in a main scanning direction of an area (overlapping area) between the first and second image obtained by the neighboring CCDs (Step S22). The CPU 2 may adjust the width Wo depending on the architecture of the CCD optical system. For example, the width Wo may be the amount of shrinkage in a horizontal direction (a reduced width of the document conveying surface 202) at the maximum. The amount of shrinkage is determined by an optical path to the CCDs and the maximum amount of paper clearance (the position of the document conveying surface 202); the maximum amount of paper clearance is determined by the mechanical architecture.

The CPU 2 further adjusts the number of lines (height) Ho that is the size in a sub-scanning direction of the overlapping area (Step S23). The number of lines Ho is the height of the scanned images at the maximum; it may be the height of a certain area with appropriate pixel values for matching at the minimum. Since the presence of a white area is not preferred for matching, the CPU 2 may adjust the number of lines Ho depending on the document type, picture or text; for example, it may adjust the number of lines Ho to low when the white area is large and adjust it to high when the white area is small. Since a high number of lines Ho requires more memory space for processing, the CPU 2 may adjust the number of lines Ho depending on the amount of memory space required for processing. The number of lines Ho is the size in a document conveying direction of the images obtained by the CCD 1 to N, at the maximum, which means that it must be equal to or lower than that size.

The overlapping area whose width Wo and height Ho are adjusted constitutes a first area of the first image and a second area of the second image, and the CPU 2 shifts the image of the second area to the image of the first area by a unit shift amount Ws. The CPU 2 repeats this shifting until these images are exactly superimposed one on the other (Step S24). The CPU 2 may shift the image of the first area to the image of the second area instead of the second area to the first area. The CPU 2 may shift both images of the first and second area at the same time. The unit shift amount Ws is one pixel in this embodiment, which is most preferred in order to detect a foreign body on the scanner glass platen 201 with a high degree of accuracy.

Every time the CPU 2 shifts the image of the second area to the image of the first area by the unit shift amount Ws, the CPU 2 calculates the degree of matching between the image of the first are and the image of the second area, which is the degree of matching on (2Wo−Ws)×Ho and stores the result of calculation on the RAM 4, for example, along with a cumulative shift amount WS that is the distance from the initial position (Step S25).

Steps S24 and S25 will be repeated until the cumulative shift amount WS exceeds the width Wo (True in Step S26). If the cumulative shift amount WS exceeds the width Wo (False in Step S26), the CPU 2 terminates the operation of calculating the degree of matching. The routine then returns to the FIG. 4 flowchart.

Steps S24 to S26 will be further described with reference to FIG. 6. FIG. 6A illustrates the first and second image obtained by neighboring CCDs, for example, the CCDs 1 and 2. There is an overlapping area between the first and second image, which is represented by a hatched area with the width Wo and the height Ho, and the overlapping area constitutes a first area of the first image and a second area of the second image. Code 400 indicates an image of the first area, and Code 500 indicates an image of the second area.

FIG. 6B schematically illustrates the image 400 of the first area and the image 500 of the second area. For illustrative purposes, the image 400 of the first area and the image 500 of the second area both have 3 pixels in width and 3 pixels in height. Each pixel has a luminance value (gray-scale); each pixel in the image 400 of the first area has the same luminance value as that of its corresponding pixel in the image 500 of the second area. That is, the image 400 and image 500 exactly match each other.

At least one of the image 400 and the image 500 is shifted to the other one. For example, the image 500 of the second area is shifted to the image 400 of the first area by one pixel that is the unit shift amount; when one column of pixels in the image 500 is exactly superimposed on one column of pixels in the image 400, the degree of matching between the image 400 and the image 500 is calculated.

Similarly, the image 500 is further shifted to the image 400 by one pixel; when two columns of pixels in the image 500 are exactly superimposed on two columns of pixels in the image 400, the degree of matching between the image 400 and the image 500 is calculated. The image 500 in the second area is still further shifted to the image 400 in the first area by one pixel; when three columns of pixels in the image 500 are exactly superimposed on three columns of pixels in the image 400, the degree of matching between the image 400 and the image 500 is calculated. In this embodiment, when all the three columns of pixels are exactly superimposed on all the three columns of pixels, an exact match between the image 400 of the first area and the image 500 of the second area can be proved. If the cumulative shift amount WS exceeds the width Wo, the operation of calculating the degree of matching is terminated.

FIGS. 7A to 7E are explanatory views on Steps S24 to S26 in the FIG. 5 flowchart when there is a foreign body such as lint or dust on the scanner glass platen 201.

FIG. 7A illustrates a sample image 300 on a sheet of document, which is a base of the image 400 of the first area and the image 500 of the second area. FIG. 7B illustrates the image 400 of the first area and the image 500 of the second area when there is a foreign body on the scanner glass platen 201. The foreign body on the scanner glass platen 201 causes a linear noise image 401 in the image 400 of the first area and a linear noise image 501 in the image 500 of the second area; the noise images 401 and 501 are found at different positions in a main scanning direction. That is because the scanner glass platen 201 and the document conveying surface 202, which is also a scanning surface, are disposed at different positions and thus have different focal depths.

At least one of the image 400 of the first area and the image 500 of the second area is shifted to the other one, pixel by pixel, as illustrated in FIG. 7C. The lower drawing of FIG. 7D illustrates the noise image 401 in the image 400 of the first area and the noise image 501 in the image 500 of the second area exactly superimposed one on the other; as is understood therefrom, the image 400 of the first area and the image 500 of the second area are not exactly superimposed one on the other. The upper drawing of FIG. 7D illustrates the image 400 of the first area and the image 500 of the second area exactly superimposed one on the other; as is understood therefrom, the noise image 401 and 501 are not exactly superimposed one on the other and these are found at different positions.

FIG. 7E is a histogram showing the changes in the degree of matching between the image 400 of the first area and the image 500 of the second area with respect to a cumulative shift amount WS, which is created using the data stored on a recording medium.

As is understood from the histogram, the degree of matching reaches its peak at two minimum points P1 and P2 when the image 500 of the second area is shifted. The image 400 of first area and the image 500 of the second area are exactly superimposed one on the other at the minimum point P1, and the noise image 401 in the image 400 and the noise image 501 in the image 500 are exactly superimposed one on the other at the minimum point P2. In other words, the presence of the two minimum points P1 and P2 proves that these images have different focal depths (the scanner glass platen 201 and the document conveying surface 202 have different focal depths, in this embodiment).

The degree of matching between the image 400 of the first area and the image 500 of the second area is calculated to be used as an indicator, with which the source of noise is identified as either a sheet of document on the scanner glass platen 201 or a foreign body on the document conveying surface 202. Specifically, it can be calculated using the following methods.

(1) Logical sum or exclusive logical sum of binary pixel values: these can be described as the following formulas.

$$R_{sum} = \sum_{j=0}^{N-1} \sum_{i=0}^{M-1} I(i, j) \cup T(i, j)$$ [Formula 1]

$$R_{xor} = \sum_{j=0}^{N-1} \sum_{i=0}^{M-1} I(i, j) \sqcup T(i, j)$$

(2) Sum of squared differences in pixel value: this can be described as the following formula.

$$R_{SSD} = \sum_{j=0}^{N-1} \sum_{i=0}^{M-1} (I(i, j) - T(i, j))^2$$ [Formula 2]

(3) Sum of absolute differences in pixel value: this can be described as the following formula.

$$R_{SAD} = \sum_{j=0}^{N-1} \sum_{i=0}^{M-1} |I(i, j) - T(i, j)|$$ [Formula 3]

(4) Normalized cross-correlation: this can be described as the following formula.

$$R_{NCC} = \frac{\sum_{j=0}^{N-1} \sum_{i=0}^{M-1} I(i, j) T(i, j)}{\sqrt{\sum_{j=0}^{N-1} \sum_{i=0}^{M-1} I(i, j)^2 \times \sum_{j=0}^{N-1} \sum_{i=0}^{M-1} T(i, j)^2}}$$ [Formula 4]

(5) Zero-mean normalized cross-correlation for eliminating the interactions of luminance as quickly as possible: this can be described as the following formula.

$$R_{ZNCC} = \frac{\sum_{j=0}^{N-1} \sum_{i=0}^{M-1} (I(i, j) - \bar{I})(T(i, j) - \bar{T})}{\sqrt{\sum_{j=0}^{N-1} \sum_{i=0}^{M-1} (I(i, j) - \bar{I})^2 \times \sum_{j=0}^{N-1} \sum_{i=0}^{M-1} (T(i, j) - \bar{T})^2}}$$ [Formula 5]

In all the formulas above, $I(i, j)$ represents a pixel value in the overlapping area of the first image and $T(i, j)$ represents a pixel value in the overlapping area of the second image.

Figure 8:
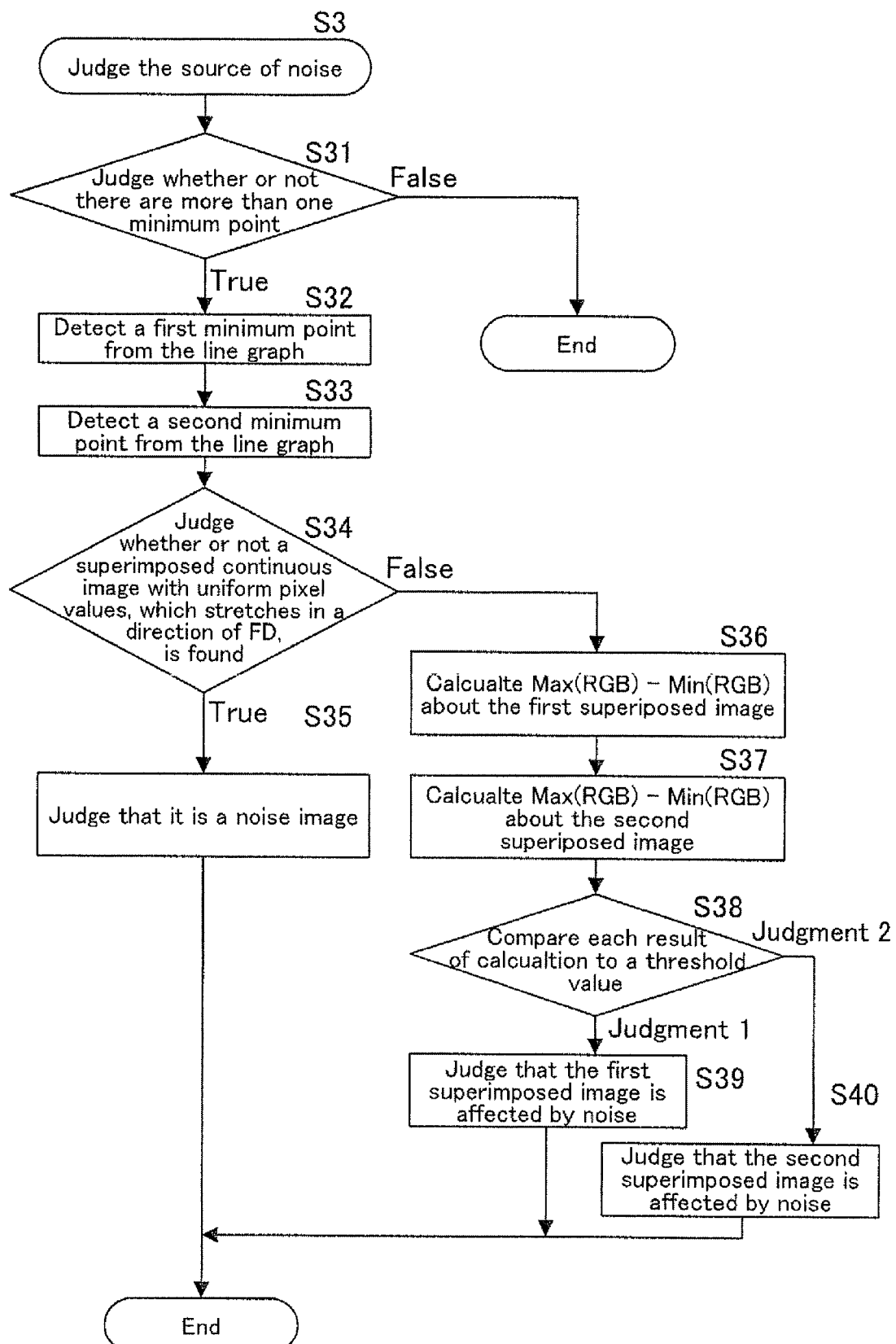
FIG. 8 is a flowchart representing the operation of identifying the source of noise, which is Step S3 in the FIG. 4 flowchart.

FIG. 8 is a flowchart representing the operation of identifying the source of noise, which is Step S3 in the FIG. 4 flowchart; FIGS. 9A to 9D are explanatory views on steps in the FIG. 8 flowchart.

The CPU 2 judges whether or not the degree of matching reaches its peak at more than one point (more than one minimum point) with reference to the histogram showing the changes in the degree of matching with respect to a shift amount (Step S31). As illustrated in FIG. 9A, the image 400 of the first area and the image 500 of the second area are exactly superimposed one on the other at one minimum point, and the noise images 401 and 501, which are caused by a foreign body on the scanner glass platen 201, are exactly superimposed one on the other at another minimum point.

If the degree of matching does not reach its peak at more than one point (False in Step S31), the routine terminates. If the degree of matching reaches its peak at more than one point (True in Step S31), the CPU 2 detects a first minimum point from the histogram showing the changes in the degree of matching (Step S32) and further detects a second minimum point from the same (Step S33). When there are three or more minimum points, the CPU 2 will detect them all. There are two minimum points in this example.

The image 400 of the first area and the image 500 of the second area at the two minimum points can be visualized as a first and second superimposed image. The CPU 2 judges whether or not a superimposed continuous image with uniform pixel values, which stretch in a direction of FD, (i.e. the noise areas exactly one on the other) is found in either one of the two superimposed images (Step S34).

As is understood from FIG. 9A, the image 400 of the first area and the image 500 of the second area at the minimum point P2 can be visualized as a second superimposed image, in which the noise images 401 and 501 are exactly superimposed one on the other; one image with uniform pixel values, which stretches in a direction of FD, can be identified as noise accordingly. The image 400 of first area and the image 500 of the second area at the minimum point P1 can be visualized as a first superimposed image, in which the image 400 of the first area and the image 500 of the second area are exactly superimposed one on the other but the noise images 401 and 501 do not; the noise images 401 and 501 can be found at different positions in a main scanning direction accordingly.

In Step S34, the CPU 2 judges whether or not the superimposed continuous image with uniform pixel values, which stretch in a direction of FD and are exactly superimposed one on the other, are found in either one of the first and second superimposed image. If such part are found in either one of them (True in Step S34), the CPU 2 judges that it is noise (detects a foreign body on the scanner glass platen 201) (Step S35) and terminates this operation. The routine then returns to the FIG. 4 flowchart.

By the way, a sheet of document may contain a linear image stretching in a direction of FD. Such a linear image causes an image with uniform pixel values in the image 400 of the first area and the image 500 of the second area and can be hardly distinguished from the noise images 401 and 501 caused by a foreign body on the scanner glass platen 201, as illustrated in FIG. 9B. Since the superimposed continuous image with uniform pixel values, which stretch in a direction of FD and exactly superimposed one on the other, is found in both of the first and second superimposed image, the CPU 2 results in False in Step S34.

In this embodiment, the CPU 2 performs Step S36 and the following steps to distinguish between them. This operation will be described with reference to FIGS. 9C and 9D. While RGB channels are arranged in a sub-scanning direction that is a direction of FD, a foreign body such as lint on the scanner glass platen 201 is rarely large enough to hide all the three channels. In many cases, the size of a foreign body is roughly comparable to the size of one or two channels.

FIG. 9C illustrates a foreign body hiding only one channel (for example, an R channel). In this case, the RGB luminance value is (0, 255, 255) when 256-level RGB luminance is enabled. Furthermore, the result of the expression Max(RGB)−Min(RGB), which means the difference between the maximum and minimum luminance values among these three channels, is equal to 255, which is a maximum value. The same holds true for a foreign body hiding two channels.

FIG. 9D illustrates a linear image of a sheet of document hiding all the RGB channels. In this case, the RGB luminance value is (0, 0, 0) and the result of the expression Max(RGB)−Min(RGB) is equal to 0, which is a minimum value. By comparing the result of the expression Max(RGB)−Min(RGB) between the first and second superimposed image, it can be judged whether or not it is a noise area.

Back to Step S36 in FIG. 8, about the first superimposed image, the CPU 2 calculates the difference between the maximum and minimum luminance values among the FD line channels (the RGB channels) using the expression Max(RGB)−Min(RGB). Similarly, in Step S37, about the second superimposed image, the CPU 2 calculates the difference between the maximum and minimum luminance values among the FD line channels using the expression Max(RGB)−Min(RGB).

In Step S38, each result of the expression Max(RGB)−Min(RGB) is compared to its threshold value set in advance as described below. When the result of the expression Max(RGB)−Min(RGB) at the first minimum point>threshold value and the result of expression Max(RGB)−Min(RGB) at the second minimum point<threshold value, the CPU 2 judges that the first superimposed image is affected by noise in Step S39. When the result of the expression Max(RGB)−Min(RGB) at the second minimum point>threshold value and the result of the expression Max(RGB)−Min(RGB) at the first minimum point<threshold value, the CPU 2 judges that the second superimposed image is affected by noise in Step S40. The routine then returns to the FIG. 4 flowchart.

Figure 10:
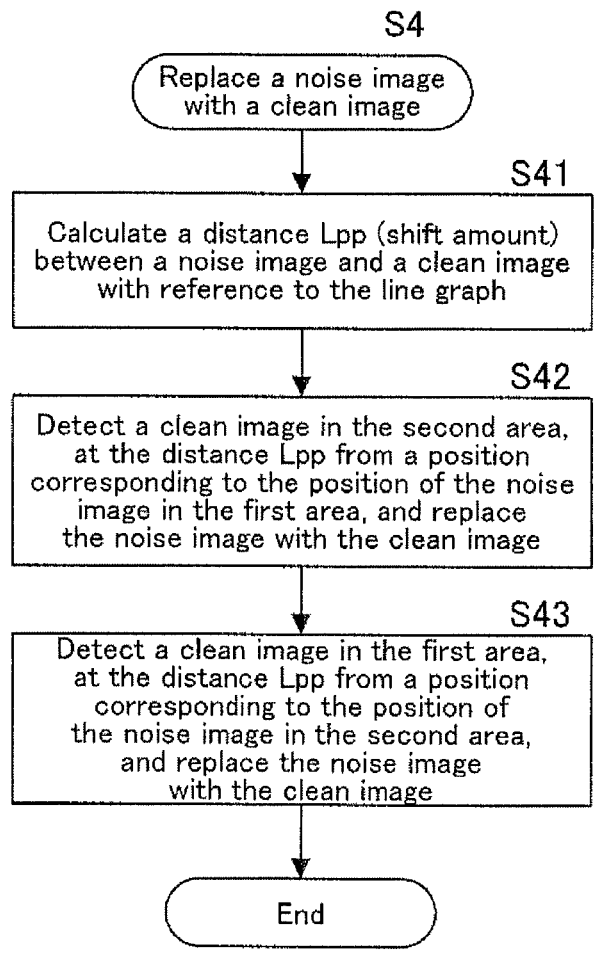
FIG. 10 is a flowchart representing the operation of replacing a noise area with a clean area, which is Step S4 in the FIG. 4 flowchart.
Figure 11A:
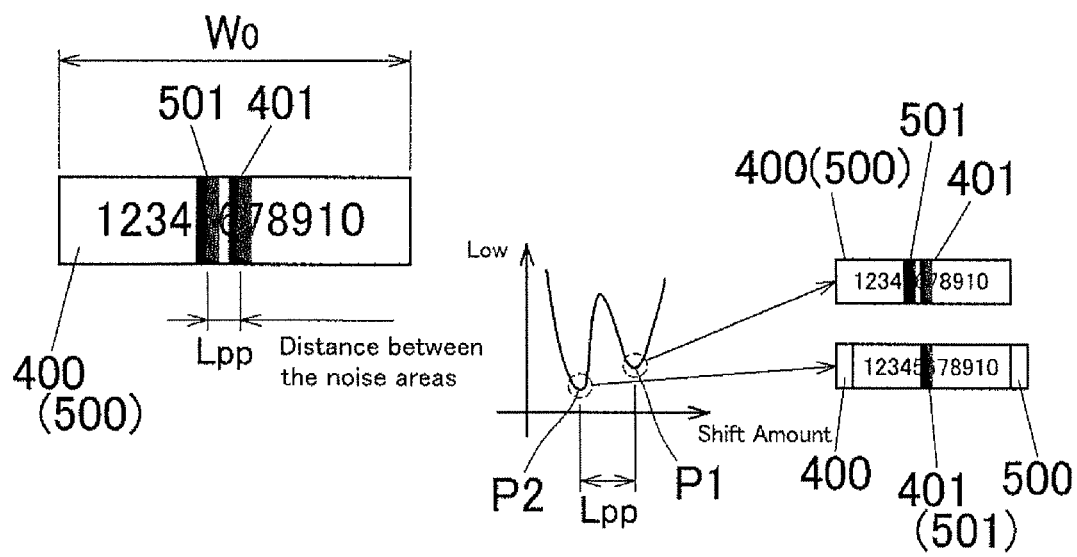
FIGS. 11A and 11B are explanatory views on steps in the FIG. 10 flowchart.
Figure 11B:
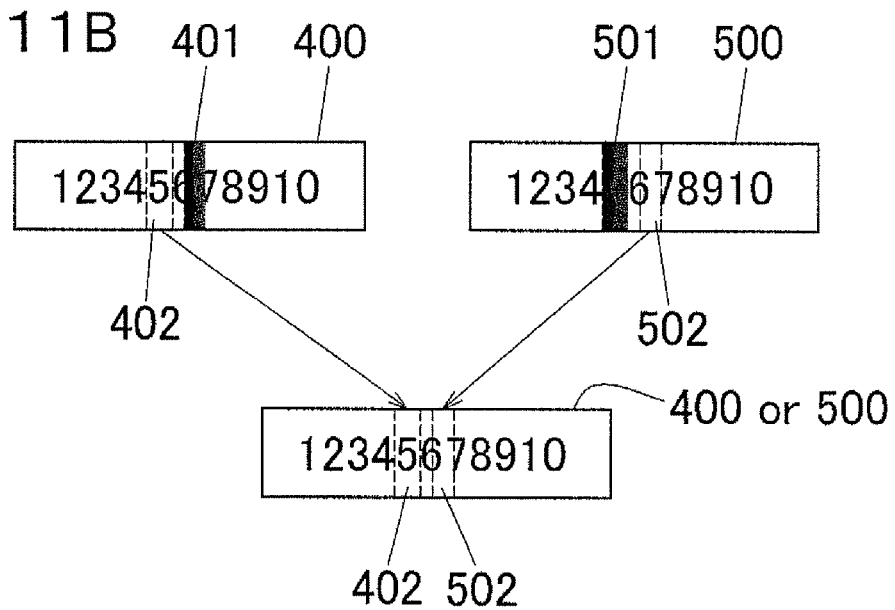

FIG. 10 is a flowchart representing the operation of replacing a noise image with a clean image, which is Step S4 in the FIG. 4 flowchart. FIGS. 11A and 11B are explanatory views on steps in the FIG. 10 flowchart. This is the operation of removing a noise image caused by a foreign body on the scanner glass platen 201 and putting a clean image as a replacement.

The right-hand part of FIG. 11A shows a histogram showing the changes in the degree of matching calculated by the degree of matching calculator 5; there are the minimum points P1 and P2 in this histogram. With reference to the histogram, the CPU 2 calculates the distance Lpp between tow noise images in the first superimposed image (the shift amount between the two minimum points) (Step S41 in FIG. 10). The distance Lpp is equal to the distance between the noise area 401 in the image 400 of the first area and the noise area 501 in the image 500 of the second area when the images 400 and 500 are exactly superimposed one on the other, as is illustrated in FIG. 11A.

The CPU 2 detects a clean image in the image 500 of the second area, at a position corresponding to the position of the noise image 401 in the image 400 of the first area and replaces the noise image 401 with the clean imsge (Step S42 in FIG. 10). Similarly, the CPU 2 detects a clean image in the image 400 of the first area 400, at a position corresponding to the position of the noise image 501 in the image 500 of the second area and replaces the noise image 501 with the clean image (Step S43 in FIG. 10). That is, the CPU 2 detects a clean image in either one of the image 400 of the first area and the image 500 of the second area, at a position corresponding to the position of the noise image in the other one. The CPU 2 then replaces the noise image with the clean image.

This replacement operation will be further described in details with reference to FIG. 11B. There is a clean image 502 in the image 500 of the second area, at a position corresponding to the position of the noise image 401 in the image 400 of the first area. The clean image 502 is at a distance Lpp from the noise image 501 in the image 500. The noise image 401 of the image 400 of the first image can be thus replaced with the clean image 502 in the image 500 of the second area. Similarly, there is a clean image 402 in the image 400 of the first area, at a position corresponding to the position of the noise image 501 in the image 500 of the second area. The clean image 402 is at a distance Lpp from the noise image 401 in the image 400 of the first area. The noise image 501 in the image 500 of the second image can be thus replaced with the clean image 402 in the image 400 of the first area. In this manner described above, the image 400 of the first area and the image 500 of the second area are cleaned up.

Figure 12:
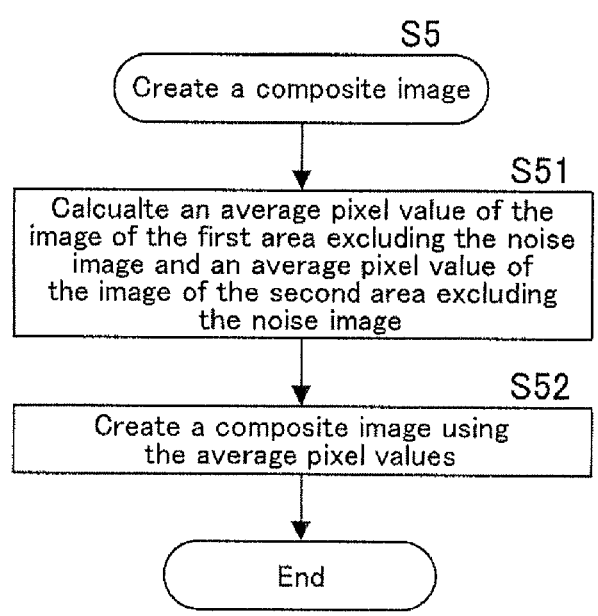
FIG. 12 is a flowchart representing the operation of creating a composite image, which is Step S5 in the FIG. 4 flowchart.

FIG. 12 is a flowchart representing the operation of creating a composite image, which is Step S5 in the FIG. 4 flowchart; FIG. 13 is an explanatory view on the operation of image composition. This is the operation of creating a composite image based on the image 400 of the first area and the image 500 of the second area, which are obtained by neighboring ones of the CCDs 1 to N, one on the other.

The CPU 2 calculates an average pixel value of the image 400 of the first area excluding the noise image 401 and an average pixel value of the image 500 of the second area excluding the noise image 501 (Step S51). For example, the left-hand part of FIG. 13A shows the image 400 of the first area excluding the noise image 401 and the right-hand part of FIG. 13A shows the image 500 of the second area excluding the noise image 501; average pixel values of these images are calculated.

Figure 13A:
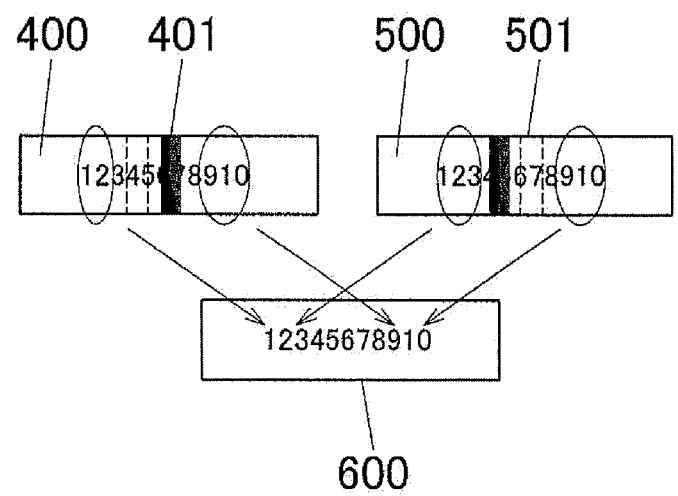
FIGS. 13A and 13B illustrate an explanatory views on the operation of image composition.

Using these average pixel values, the CPU 2 creates a composite image 600 as illustrated in FIG. 13A (Step S52). After the creation of a composite image, the routine returns to the FIG. 4 flowchart.

Figure 13B:
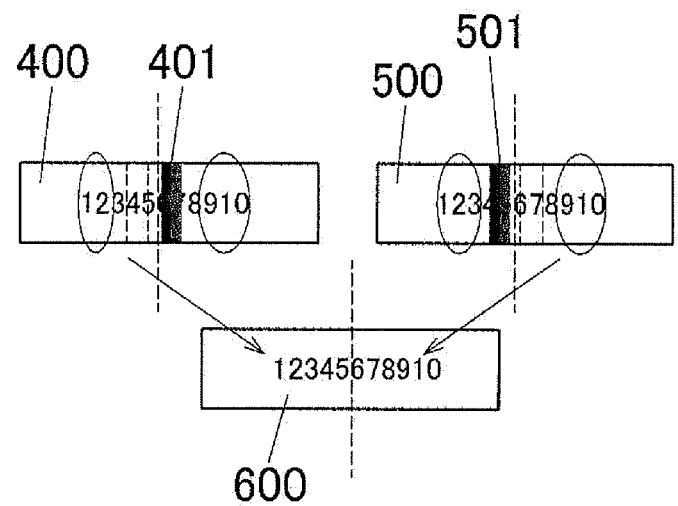

The CCDs 1 to N can hardly read both ends of their target scanning areas with a high degree of accuracy. As illustrated in FIG. 13A, a CCD closer to the left end can read a left part of the images 400 and 500 with a high degree of accuracy and a CCD closer to the right end can read a right part of the images 400 and 500 with a high degree of accuracy. To solve this problem, this embodiment can be configured as illustrated in FIG. 13B: a left half of the image 400 of the first area and a right half of the image 500 of the second area, respectively, are extracted from the images 400 and 500 and the composite image 600 is created by combining the left half of the image 400 of the first area and the right half of the image 500 of the second area together.

While one embodiment of the present invention has been described in details herein it should be understood that the present invention is not limited to the foregoing embodiment. For example, in this embodiment, a foreign body such as lint or dust on the scanner glass platen 201 is detected using scanned images and image correction is performed by replacing a noise image is replaced with a clean image. This embodiment may be configured as the following: a foreign body such as lint or dust on the scanner glass platen 201 is detected and image correction is not performed but a message requesting to clean up the scanner glass platen 201 is displayed instead.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image reading device comprising:
   a scanner glass; and
   a plurality of CCD photo-sensors arranged at intervals in a main scanning direction, the CCD photo-sensors reading an image on a sheet of document conveyed in a sub-scanning direction on a document conveying surface, the document conveying surface disposed above the scanner glass,
   wherein the CCD photo-sensors are arranged to allow two or more neighboring CCD photo-sensors to obtain a first image and a second image by scanning the same area of the surface of the scanner glass and the document conveying surface,
   the image reading device further comprising:
   a size adjuster adjusting the size, in a main scanning direction and a sub-scanning direction, of an overlapping area between the first and second image obtained by the neighboring CCD photo-sensors, the overlapping area constituting a first area of the first image and a second area of the second image;
   a superimposing portion superimposing either one of an image of the first area and an image of the second area on the other one by shifting at least one of the image of the first area and the image of the second area to the other one, the first and second area having the size adjusted by the size adjuster;
   a degree-of-matching calculator calculating the degree of matching between the image of the first area and the image of the second area while the superimposing portion is shifting at least one of the image of the first area and the image of the second area to the other one;
   a judgment portion judging whether or not the images having different focal depths exist based on the degree of matching calculated by the degree-of-matching calculator; and
   a foreign body detector detecting a foreign body on the surface of the scanner glass by detecting a continuous image stretching in a document conveying direction in both of the images having different focal depths, if the judgment portion judges that the images having different focal depths exist.

2. The image reading device according to claim 1, wherein:
   the size in a main scanning direction being adjusted by the size adjuster is a reduced width of the overlapping area on the sheet of the document on the document conveying surface at the maximum, the reduced width of the overlapping area being determined by an optical path to the CCD photo-sensors and the position of the document conveying surface, the position being determined by a mechanical architecture of the image reading device; and
   the size in a sub-scanning direction being adjusted by the size adjuster is the size in a document conveying direction of the images obtained by the CCD photo-sensors, at the maximum.

3. The image reading device according to claim 1, wherein the superimposing portion further repeats the operation of shifting at least one of the image of the first area and the image of the second area to the other one by one unit of pixels until a shift amount reaches the size in a main scanning direction being adjusted by the size adjuster.

4. The image reading device according to claim 1, wherein:
   the degree-of-matching calculator calculates the degree of matching using any of the following methods:
   logical sum of binary pixel values;
   exclusive logical sum of binary pixel values;
   sum of squared differences in pixel value;
   sum of absolute differences in pixel value; and
   normalized cross-correlation; and
   the degree-of-matching calculator further creates and records a histogram, the histogram showing changes in the degree of matching with respect to a shift amount by which the superimposing portion shifts at least one of the image of the first area and the image of the second area to the other one.

5. The image reading device according to claim 4, wherein the judgment portion further judges that the images having different focal depths exist by detecting two points in the histogram created by the degree-of-matching calculator, the two points showing the two highest degrees of matching.

6. The image reading device according to claim 5, wherein:
the foreign body detector further checks whether or not a superimposed continuous image stretching in the document conveying direction exists in either a first superimposed image or a second superimposed image, the superimposed continuous image is obtained by superimposing either one of the continuous image in the first area and the continuous image in the second area on the other one, the first superimposed image and the second superimposed image are obtained by superimposing either one of the image of the first area and the image of the second area on the other one at the two points, the two points showing the two highest degrees of matching;
if the superimposed continuous image stretching in the document conveying direction exists in either the first superimposed image or the second superimposed image, the foreign body detector identifies the superimposed continuous image stretching in the document conveying direction as noise image caused by a foreign body on the surface of the scanner glass.

7. The image reading device according to claim 6, wherein:
if the superimposed continuous image stretching in the document conveying direction exists in both the first superimposed image and the second superimposed image;
the foreign body detector identifies as noise image the superimposed continuous image in the first or second superimposed image that has the difference between the maximum and minimum pixel values in the superimposed continuous image, which is equal to or greater than a threshold value, the pixel values obtained by multiple channels of the CCD photo-sensors.

8. The image reading device according to claim 1, further comprising a distance calculator calculating the distance between two points in a histogram created from the calculation results obtained by the degree-of-matching calculator, the two points showing the two highest degrees of matching, wherein the images of the first and second area are exactly superimposed one on the other at one of the two points and the noise images of the first and second area are exactly superimposed one on the other at the other one of the two points, the image reading device further comprising:
a clean image detector detecting a clean image in either one of the first and second area, at a position corresponding to the position of the noise image in the other one, with reference to the distance calculated by the distance calculator;
a replacement portion replacing the noise image with the clean image detected by the clean image detector; and
a composite image creator creating a composite image based on the images of the first and second area exactly superimposed one on the other.

9. The image reading device according to claim 8, wherein the composite image creator creates a composite image using an average pixel value of the image of the first area excluding the noise area and an average pixel value of the image of the second area excluding the noise area.

10. The image reading device according to claim 8, wherein the composite image creator creates a composite image by combining a left half width of either one of the images of the first and second area and a right half width of the other one together.

11. A method for an image reading device to detect a foreign body on the surface of a scanner glass, the image reading device comprising:
the scanner glass; and
a plurality of CCD photo-sensors being arranged at intervals in a main scanning direction, the CCD photo-sensors reading an image on a sheet of document conveyed in a sub-scanning direction on a document conveying surface, the document conveying surface being disposed above the scanner glass,
wherein the CCD photo-sensors are arranged to allow two or more neighboring ones of the CCD photo-sensors to obtain a first image and a second image by scanning the same area of the surface of the scanner glass and the document conveying surface,
the method comprising the following steps of the image reading device:
adjusting the size, in a main scanning direction and a sub-scanning direction, of an overlapping area between the first and second image obtained by the neighboring CCD photo-sensors, the overlapping area constituting a first area of the first image and a second area of the second image;
superimposing either one of an image of the first area and an image of the second area on the other one by shifting at least one of the image of the first area and the image of the second area to the other one, the first and second area having the size being adjusted;
calculating the degree of matching between the image of the first area and the image of the second area while at least one of the image of the first area and the image of the second area is being shifted to the other one;
judging whether or not the images having different focal depths exist with reference to the degree of matching being calculated; and
detecting a foreign body on the surface of the scanner glass by detecting a continuous image stretching in a document conveying direction in both of the images having different focal depths, if it is judged that the images having different focal depths exist.

12. A non-transitory computer-readable recording medium storing a program to be run by an image reading device to detect a foreign body on the surface of a scanner glass, the image reading device comprising:
the scanner glass; and
a plurality of CCD photo-sensors being arranged at intervals in a main scanning direction, the CCD photo-sensors reading an image on a sheet of document conveyed in a sub-scanning direction on a document conveying surface, the document conveying surface being disposed above the scanner glass,
wherein the CCD photo-sensors are arranged to allow two or more neighboring ones of the CCD photo-sensors to obtain a first image and a second image by scanning the same area of the surface of the scanner glass and the document conveying surface,
the program making a computer of the image reading device execute the following steps:
adjusting the size, in a main scanning direction and a sub-scanning direction, of an overlapping area between the first and second image obtained by the neighboring CCD photo-sensors, the overlapping area constituting a first area of the first image and a second area of the second image;

superimposing either one of an image of the first area and an image of the second area on the other one by shifting at least one of the image of the first area and the image of the second area to the other one, the first and second area having the size being adjusted;

calculating the degree of matching between the image of the first area and the image of the second area while at least one of the image of the first area and the image of the second area is being shifted to the other one;

judging whether or not the images having different focal depths exist with reference to the degree of matching being calculated; and detecting a foreign body on the surface of the scanner glass by detecting a continuous image stretching in a document conveying direction in both of the images having different focal depths, if it is judged that the images having different focal depths exist.

13. The non-transitory computer-readable recording medium according to claim 12, wherein:

the size in a main scanning direction being adjusted by the size adjuster is a reduced width of the overlapping area on the sheet of the document on the document conveying surface at the maximum, the reduced width of the overlapping area being determined by an optical path to the CCD photo-sensors and the position of the document conveying surface, the position being determined by a mechanical architecture of the image reading device; and the size in a sub-scanning direction being adjusted by the size adjuster is the size in a document conveying direction of the images obtained by the CCD photo-sensors, at the maximum.

14. The non-transitory computer-readable recording medium according to claim 12, wherein the operation of shifting at least one of the image of the first area and the image of the second area to the other one by one unit of pixels is repeated until a shift amount reaches the size in a main scanning direction being adjusted.

15. The non-transitory computer-readable recording medium according to claim 12, wherein:

the degree of matching is calculated using any of the following methods:
    logical sum of binary pixel values;
    exclusive logical sum of binary pixel values;
    sum of squared differences in pixel value;
    sum of absolute differences in pixel value; and
    normalized cross-correlation; and a histogram is created and recorded, the histogram showing changes in the degree of matching with respect to a shift amount by which at least one of the first and second area is shifted to the other one.

16. The non-transitory computer-readable recording medium according to claim 15, wherein it is judged that the images having different focal depths exist by detecting two points in the histogram being created, the two points showing the two highest degrees of matching.

17. The non-transitory computer-readable recording medium according to claim 16, wherein:

it is checked whether or not a superimposed continuous image stretching in the document conveying direction exists in either a first superimposed image or a second superimposed image, the superimposed continuous image is obtained by superimposing either one of the continuous image in the first area and the continuous image in the second area on the other one, the first superimposed image and the second superimposed image are obtained by superimposing either one of the image of the first area and the image of the second area on the other one at the two points, the two points showing the two highest degrees of matching;

if the superimposed continuous image stretching in the document conveying direction exists in either the first superimposed image or the second superimposed image, the superimposed continuous image stretching in the document conveying direction is identified as noise image caused by a foreign body on the surface of the scanner glass.

18. The non-transitory computer-readable recording medium according to claim 17, wherein if the superimposed continuous image stretching in the document conveying direction exists in both the first superimposed image and the second superimposed image;

the superimposed continuous image in the first or second superimposed image that has the difference between the maximum and minimum pixel values in the superimposed continuous image, which is equal to or greater than a threshold value, is identified as noise image, the pixel values obtained by multiple channels of the CCD photo-sensors.

19. The non-transitory computer-readable recording medium according to claim 12, storing the program to be run by the computer, the program making the computer further execute calculating the distance between two points in a histogram created from the calculation results, the two points showing the highest degrees of matching, wherein the images of the first and second area are exactly superimposed one on the other at one of the two points and the noise images of the first and second area are exactly superimposed one on the other at the other one of the two points, the program making the computer further execute:

detecting a clean image in either one of the first and second area, at a position corresponding to the position of the noise image in the other one, with reference to the distance being calculated;

replacing the noise image with the clean image being detected; and creating a composite image based on the images of the first and second area exactly superimposed one on the other.

20. The non-transitory computer-readable recording medium according to claim 19, wherein a composite image is created using an average pixel value of the image of the first area excluding the noise area and an average pixel value of the image of the second area excluding the noise area.

21. The non-transitory computer-readable recording medium according to claim 19, wherein a composite image is created by combining a left half width of either one of the images of the first and second area and a right half width of the other one together.

* * * * *